United States Patent [19]

Lynch

[11] Patent Number: 4,550,835
[45] Date of Patent: Nov. 5, 1985

[54] TIRE CHANGING RACK

[76] Inventor: India M. Lynch, 14170 Painesville-Warren Rd., Painesville, Ohio 44077

[21] Appl. No.: 635,712

[22] Filed: Jul. 30, 1984

[51] Int. Cl.⁴ .............................................. A47F 7/04
[52] U.S. Cl. ...................................... 211/24; 211/208; 248/188.5; 248/346
[58] Field of Search .................... 211/24, 23, 22, 21, 211/20, 208; 248/346, 151, 188.5, 309.1; 272/73

[56] References Cited

U.S. PATENT DOCUMENTS

| | | | |
|---|---|---|---|
| 698,231 | 4/1902 | Starzman | 211/24 |
| 2,323,846 | 7/1943 | Saltsman | 211/24 |
| 2,504,947 | 4/1950 | Grange | 211/24 X |
| 2,875,007 | 2/1959 | Fox | 248/188.5 |
| 3,510,007 | 5/1970 | Walklet et al. | 211/24 |
| 3,829,908 | 8/1974 | Thomas | 211/208 X |
| 4,026,546 | 5/1977 | Omori | 211/22 X |

Primary Examiner—Robert W. Gibson, Jr.
Attorney, Agent, or Firm—Woodling, Krost, Rust & Hochberg

[57] ABSTRACT

A tire rack for changing a vehicle tire comprised of two tubular members formed in the shape of an inverted U with the ends of the U-shape adapted to fit into brace members which engage the ground. Mechanical means are provided between the ends of the U-shape and the brace members to vary the vertical height of the rack. The intermediate portion of the U-shape is formed with a reverse U-shape which carries ball members adapted to engage a tire to be changed to facilitate movement of the tire.

5 Claims, 7 Drawing Figures

TIRE CHANGING RACK

The present invention relates in general to a structure for use in changing tires or trucks and cars and particularly to such a structure for accomplishing this efficiently and expeditiously.

The prior art broadly includes devices for accomplishing the above recited end result; however, the devices known to applicant are cumbersome to use and in general do not accomplish the desired end result conveniently. The closest prior art known to applicant is found in U.S. Pat. Nos. 806,599; 1,343,650; 2,207,443; 2,600,742; 2,695,717; and 4,286,369. The U.S. Pat. No. 2,600,742 structure would appear to be the closest to applicant's structure disclosed herein but the U.S. Pat. No. 2,600,742 is a heavy unwieldly device which is not capable of being dismantled and easily stored, will not enable easy universal shifting of a tire held thereon, cannot be vertically adjusted and does not have a shape whih assists in keeping a tire from rolling off of the structure.

The present invention overcomes the above referred to deficiencies in a convenient and efficient manner.

An object of the present invention is to provide a tire changing rack which is light in weight yet sturdy in construction and can be conveniently disassembled for storage in a car trunk.

Another object of the present invention is to provide a tire changing rack:
1. whose vertical height can be easily adjusted.
2. which has a shape which enables a tire to be conveniently rolled thereon and when located thereon is conveniently retained there.
3. which has bearing members which enable universal lateral shifting of a wheel and tire to more easily align the openings in the wheel with the threaded lugs on the axle.

Other objects and a fuller understanding of this invention may be had by referring to the following description and claims, taken in conjunction with the accompanying drawings, in which:

Figure 1:
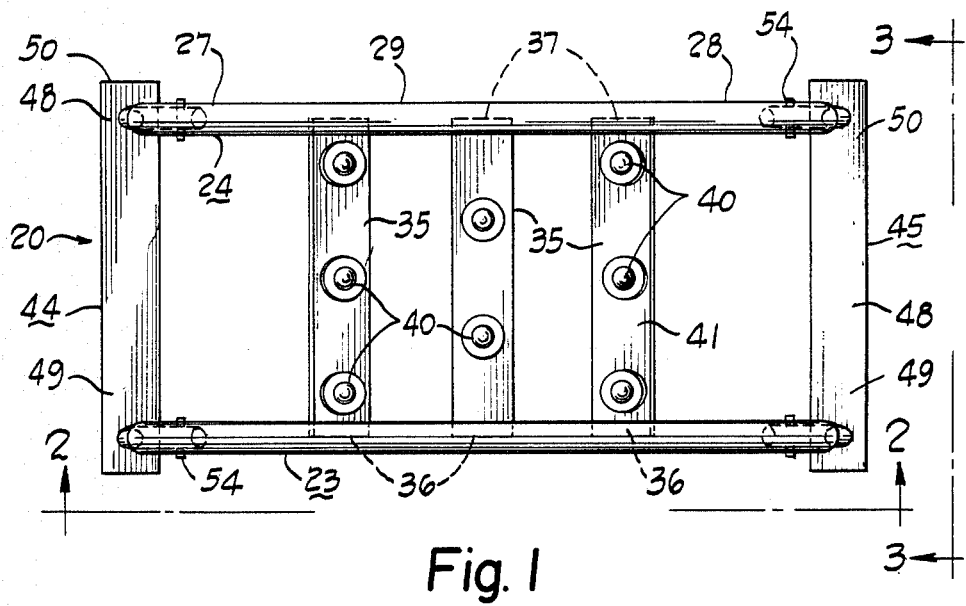
FIG. 1 is a plan view of the tire changing rack of the present invention.

The tire changing rack of the present invention has been indicated generally by reference numeral 20 and includes in combination first and second spaced and generally U-shaped bar brace members 23 and 24, each of which is of a tubular construction and each of which has first and second end portions 27 and 28 respectively and an intermediate portion 29 between the recited end portions.

The intermediate portions 29 of each of the brace members 23 and 24 has a slight U-shape in a direction opposite to the recited generally U-shaped configuration of the bar brace members. This second recited slight U-shape has been indicated in FIG. 2 by the reference numeral 33. The first recited generally U-shape of the bar brace members has been indicated in FIG. 2 by the reference numeral 34.

A plurality of spaced bearing strips 35 (shown as three in number herein). Each has first and second end portions 36 and 37 respectively and the first end portions are secured to one of the bar brace members and the second end portions are secured to another of the bar brace members by welding or other suitable means.

A plurality of caster ball bearings 40 are mounted upon the upper 41 surface of the bearing strips and are located in a position to engage the surface of the tire to be handled by the rack. The mounting of the caster ball bearings is such that they will rotate in universal fashion, or in other words, in all directions so that a tire and wheel which is being changed can be moved with great ease both rotationally and laterally relative to a vehicle axle to which it is being attached.

Figure 2:
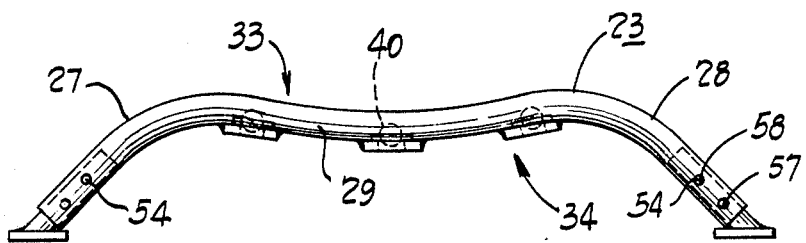
FIG. 2 is a view taken generally along the line 2—2 of FIG. 1.
Figure 3:
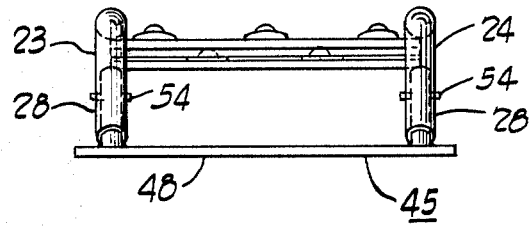
FIG. 3 is a view taken generally along the line 3—3 of FIG. 1.
Figure 4:
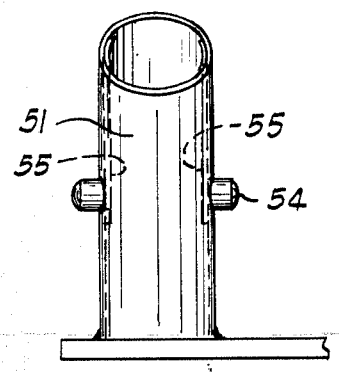
FIG. 4 is an enlarged fragmentary view of one of the tubular members used to mount the tire changing rack of the present invention.
Figure 5:
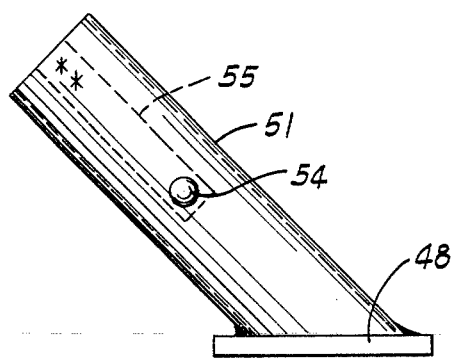
FIG. 5 is a view of the tubular member illustrated in FIG. 4 taken at 90° to the view of FIG. 4.
Figure 6:
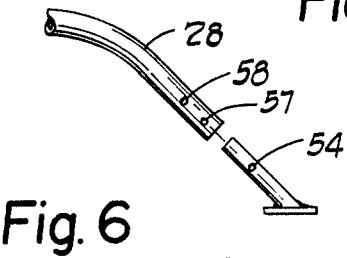
FIG. 6 is a fragmentary view illustrating the connection between the tubular member shown in FIGS. 4 and 5 and the main portion of the tire changing rack.

First and second leg brace members 44 and 45 respectively are located at the first and second end portions respectively of the bar brace members 23 and 24. Each of the leg brace members comprises a flat plate member 48 for flatly and securely engaging the ground adjacent a vehicle tire to be changed and this flat plate member has first and second end portions 49 and 50 respectively. At each end of the flat plate member there is provided a short tubular member 51 secured to the plate member by welding or other suitable means and extending at an acute angle to plate as illustrated in FIGS. 2 and 5, for example. Each of the tubular members is of a size to fit within the tubular construction of a corresponding end portion of a bar brace member 23 or 24 and each of these tubular members is provided with pins 54 each of which is supported by a leaf spring member 55 which in turn biases the pin to an extended position as seen in FIG. 4. The spring biasing of pins 54 is such that when urged inwardly they will recede within the tubular member to a position essentially corresponding to the outside diameter of the tubular member 51. Each end portion 27 and 28 of each of the brace members 23 and 24 is provided with at least two openings 57 and 58 to accommodate the pins 54 in the tubular members 51. FIG. 6 illustrates the cooperation between the tubular members 51 and the ends of the brace members 23 and 24 and it will be noted that the ends of the brace members fit over the tubular members 51 and the pins 54 are accommodated in either opening 57 or 58 depending upon the vertical height desired for the tire changing rack 20. It will be readily understood by those skilled in the art that additional openings similar to 57 or 58 may be provided and for example in combination with a U-shape of slightly different configuration than the U-shape 34 so as to accommodate a range of vertical heights for which the rack may be designed.

Figure 7:
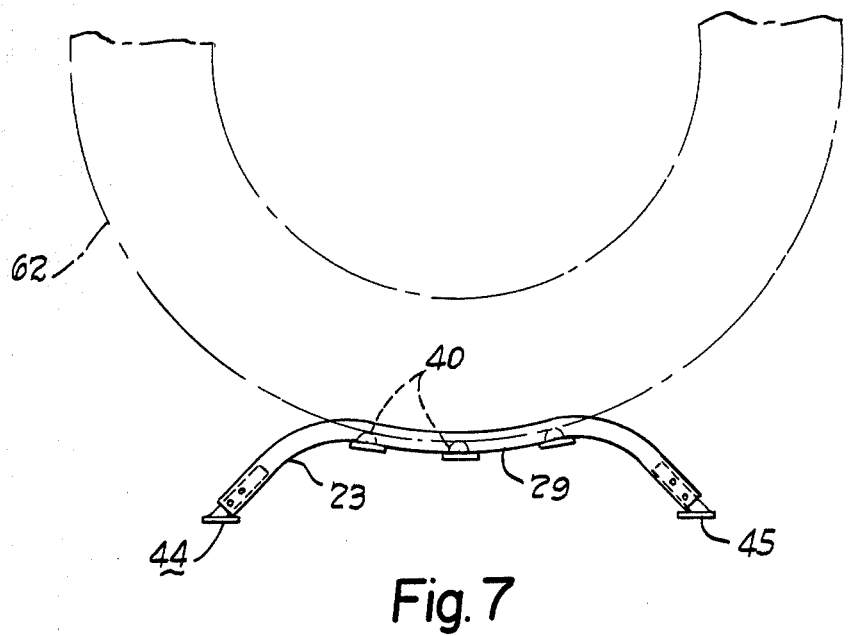
FIG. 7 is a view of the tire changing rack shown in FIG. 2 and illustrating schematically the positioning of a tire thereon which is being mounted or dismounted from the axle of a motor vehicle.

It will be appreciated that the tire changing rack of the present invention is normally stored in the front of the motor vehicle or other convenient place in disassembled condition wherein the connected bar brace members are disconnected from the flat plate members 48 and associated tubular member constructions 51. When it is desired to change a vehicle tire the rack is removed from storage and assembled in a manner heretofore described. The device is positioned firmly on the ground by means of the flat plate members 48 and is located next to a tire 62 illustrated schematically in FIG. 7. The nuts holding the tire on the axle bolts can next be removed and the tire may then be pulled outwardly by a person using the device through the assistance of the caster ball bearings 40 engaging the surface of the tire. The tire can then be rolled about its axis onto the ground from its position shown in FIG. 7. In like fashion, a fully inflated tire can be rolled about its axis to the position of FIG. 7 and then moved laterally inwardly and attached to the axle. When the tire has been changed the rack can be conveniently disassembled and restored.

It will thus be seen that a tire changing rack has been provided that can be easily handled and stored and which efficiently enables one to more easily change a tire.

Although this invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

What is claimed is:

1. A tire changing rack including in combination first and second spaced and generally U-shaped bar brace members of tubular construction each having first and second end portions and an intermediate portion therebetween, said intermediate portion of each said bar brace member having a slight U-shape in a direction opposite to said generally U-shaped configuration of said bar brace members, a plurality of spaced bearing strips each having first and second end portions secured respectively to said first and second bar brace members at said intermediate portions, a plurality of caster ball bearings mounted on an upper surface of each of said bearing strips and located in a position to engage the surface of a tire to be handled by said rack, first and second leg brace members located respectively at said first and second end portions of said bar brace members, each said leg brace member comprising a flat plate member for flatly engaging the ground adjacent a vehicle tire to be changed and having first and second end portions, a tubular member secured to and extending upwardly and at an acute angle from said first and second end portions of each of said flat plate members, each said tubular member being of a size to fit within said tubular construction of said bar brace member and each having a laterally extending spring biased pin, a plurality of laterally extending and axially spaced openings in said first and second end portions of each of said bar brace members, said tubular members residing in respective ones of said end portions of said first and second bar brace members with a spring biased pin of said tubular members residing in a lateral opening in a said end portion of said bar brace member.

2. A tire changing rack including in combination first and second spaced and generally U-shaped bar brace members of tubular construction each having first and second end portions and an intermediate portion therebetween, a plurality of spaced bearing strips each having first and second end portions secured respectively to said first and second bar brace members at said intermediate portions, a plurality of roller means mounted on an upper surface of each of said bearing strips and located in a position to engage the surface of a tire to be handled by said rack, first and second leg brace members located respectively at said first and second end portions of said bar brace members, each said leg brace member comprising a flat plate member for flatly engaging the ground adjacent a vehicle tire to be changed and having first and second end portions, a tubular member secured to and extending upwardly and at an acute angle from said first and second end portions of each of said flat plate members, each said tubular member being of a size to accommodate said tubular construction of said bar brace member and each having a laterally extending spring biased pin, a plurality of laterally extending and axially spaced openings in said first and second end portions of each of said bar brace members, a spring biased pin of said tubular members residing in a lateral opening in a said end portion of a said bar brace member.

3. A tire changing rack as claimed in claim 2 wherein said frame at an intermediate portion of said U-shaped configuration has a slight U-shaped configuration opposite said first mentioned U-shaped configuration.

4. A tire changing rack including in combination first and second spaced and generally U-shaped bar brace members of tubular construction each having first and second end portions and an intermediate portion therebetween, bearing strips having first and second end portions secured respectively to said first and second bar brace members at said intermediate portions, a plurality of roller means mounted on an upper surface of said bearing strips and located in a position to engage the surface of a tire to be handled by said rack, leg brace means located respectively at said first and second end portions of said bar brace members, said leg braces means comprising a flat plate member for flatly engaging the ground, an adjustment member secured to and extending upwardly and at an acute angle from each of said flat plate members to said end portions of said bar brace members, and wall means acting between said adjustment members and said end portions of said bar brace members to provide for the vertical adjustment of said U-shaped bar brace members.

5. A tire changing rack as claimed in claim 4 wherein said frame at an intermediate portion of said U-shaped configuration has a slight U-shaped configuration opposite said first mentioned U-shaped configuration.

* * * * *